United States Patent
Han et al.

(10) Patent No.: US 9,541,741 B2
(45) Date of Patent: Jan. 10, 2017

(54) ZOOM LENS AND IMAGE PICKUP APPARATUS INCLUDING A DEFORMABLE MIRROR

(71) Applicant: SAMSUNG ELECTRONICS CO., LTD., Suwon-si (KR)

(72) Inventors: Hee-chul Han, Hwaseong-si (KR); Jong-Chul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 159 days.

(21) Appl. No.: 14/290,268

(22) Filed: May 29, 2014

(65) Prior Publication Data

US 2015/0168681 A1 Jun. 18, 2015

(30) Foreign Application Priority Data

Dec. 12, 2013 (KR) .................. 10-2013-0154842

(51) Int. Cl.
  *G02B 13/00* (2006.01)
  *H04N 5/225* (2006.01)
(52) U.S. Cl.
  CPC .......... *G02B 13/009* (2013.01); *H04N 5/2254* (2013.01)
(58) Field of Classification Search
  CPC .................. G02B 13/009; H04N 5/2254
  USPC ........................................ 348/347
  See application file for complete search history.

(56) References Cited

U.S. PATENT DOCUMENTS

2003/0169493 A1* 9/2003 Draganov .......... G02B 17/0631
  359/399
2004/0130647 A1 7/2004 Kuba
2004/0136093 A1* 7/2004 Nishioka .......... G02B 13/0045
  359/726
2006/0056084 A1 3/2006 Araki
2008/0266655 A1* 10/2008 Levoy .................. G02B 21/361
  359/368

(Continued)

FOREIGN PATENT DOCUMENTS

JP 2006-115137 A 4/2006
JP 2007-193015 A 8/2007

(Continued)

OTHER PUBLICATIONS

Communication dated Feb. 12, 2015 issued by the Int. Searching Authority in counterpart Int. Application No. PCT/KR2014/012170 (PCT/ISA/210 & 237).

*Primary Examiner* — Nhan T Tran
*Assistant Examiner* — Chan Nguyen
(74) *Attorney, Agent, or Firm* — Sughrue Mion, PLLC

(57) ABSTRACT

A folded optical zoom lens and an image pickup apparatus including the same are provided. The zoom lens includes a first reflection plate and a second reflection plate having reflection surfaces facing each other; a light incidence region disposed around the second reflection plate; a light exit region disposed in a hole in a center portion of the first reflection plate; and a mirror, which is disposed around the second reflection plate and reflects light incident via the light incidence region toward the first reflection plate. The mirror is configured to change a length of a an optical path of light incident via the light incidence region, reflected between the first reflection plate and the second reflection plate, and exiting the zoom lens via the light exit region.

9 Claims, 5 Drawing Sheets

(56) References Cited

U.S. PATENT DOCUMENTS

2011/0176205 A1* 7/2011 Shaw .................... G02B 23/06
 359/365

FOREIGN PATENT DOCUMENTS

| JP | 2008-40306 A | 2/2008 |
|---|---|---|
| KR | 10-2006-0067439 A | 6/2006 |
| KR | 10-2006-0087282 A | 8/2006 |

* cited by examiner

ZOOM LENS AND IMAGE PICKUP APPARATUS INCLUDING A DEFORMABLE MIRROR

RELATED APPLICATION

This application claims the benefit of Korean Patent Application No. 10-2013-0154842, filed on Dec. 12, 2013, in the Korean Intellectual Property Office, the disclosure of which is incorporated herein in its entirety by reference.

BACKGROUND

1. Field

Apparatuses consistent with exemplary embodiments relate to a zoom lens and an image pickup apparatus including the same, and more particularly, to a folded optics zoom lens with reduced thickness and an image pickup apparatus including the same.

2. Description of the Related Art

A zoom lens is a lens capable of adjusting an angle of view of an image pickup apparatus, such as a camera, by changing a focal length. A general dioptric zoom lens includes a plurality of lens elements and may change a focal length by changing distances between the lens elements. However, since such a dioptric zoom lens includes a plurality of lens elements, the lens is longer and heavier than a single focus lens, and a length of the lens changes as a focal length is changed. Therefore, it is difficult to install an image pickup apparatus including an optical zoom lens in a thin portable device, such as a mobile phone.

In view of this, image pickup apparatuses for mobile phones generally use single focus lenses. Therefore, any zoom function provided by a mobile phone is not an optical zooming function, but rather a magnification of an image by an image processing circuit. Therefore, resolutions of magnified images are limited.

SUMMARY

According to an aspect of an exemplary embodiment, a zoom lens includes a first reflection plate and a second reflection plate having reflection surfaces arranged to face each other; a light incidence region formed around the second reflection plate; a light exit region formed through a center portion of the first reflection plate; and a driven mirror, which is arranged around the first reflection plate and reflects light incident via the light incidence region toward the second reflection plate, wherein the driven mirror is configured to change a length of an optical path between the light incidence region and the light exit region.

The driven mirror may include a deformable mirror including a reflection surface that is mechanically or electrically deformable.

The driven mirror may be rotatable around a rotation axis.

A direction of the rotation axis of the driven mirror may be perpendicular to a direction of an optical axis of the zoom lens and to a radial direction of the zoom lens.

The driven mirror may include a plurality of rotatable mirrors arranged around the first reflection plate.

A reflection surface of the driven mirror may be concave.

The driven mirror may be a micro-mirror array including a plurality of electrostatically drivable micro-mirrors.

The first reflection plate may have a ring-like shape and the second reflection plate may have a circular shape.

The reflection surface of the first reflection plate and the reflection surface of the second reflection plate may be flat.

The reflection surface of the first reflection plate may be concave, and the reflection surface of the second reflection plate may be convex.

The zoom lens may further include an array of a plurality of electrostatically drivable micro-mirrors that are arranged on at least one of the reflection surface of the first reflection plate and the reflection surface of the second reflection plate.

According to an aspect of another exemplary embodiment, a zoom lens includes a first reflection plate and a second reflection plate having reflection surfaces arranged to face each other; a light incidence region formed around the second reflection plate; a light exit region formed through a center portion of the first reflection plate; a tilted mirror, which is arranged around the first reflection plate and reflects light incident via the light incidence region; and a driven mirror, which is arranged around the second reflection plate and reflects light reflected by the tilted mirror toward the first reflection plate, wherein the driven mirror is configured to change a length of an optical path between the the light incidence region and the light exit region.

According to an aspect of another exemplary embodiment, an image pickup apparatus includes a zoom lens having one of the structures as described above; and an image sensor, which is arranged at the light exit region of the zoom lens and includes a plurality of 2-dimensionally arranged pixels.

The image sensor includes may include one of a charge-coupled device (CCD) image sensor and a complementary metal oxide semiconductor (CMOS) image sensor.

The image pickup apparatus may further include a micro-lens array, which is arranged between the zoom lens and the image sensor and includes a plurality of 2-dimensionally arranged micro-lenses.

Each of the micro-lenses of the micro-lens array may correspond to a plurality of pixels of the image sensor, and the micro-lenses of the micro-lens array provide a plurality of images with different viewpoints or different focuses to the plurality of pixels.

The micro-lens array may be arranged on a focal plane of the zoom lens.

BRIEF DESCRIPTION OF THE DRAWINGS

These and/or other exemplary aspects and advantages will become apparent and more readily appreciated from the following description of the embodiments, taken in conjunction with the accompanying drawings in which.

DETAILED DESCRIPTION

Figure 1:
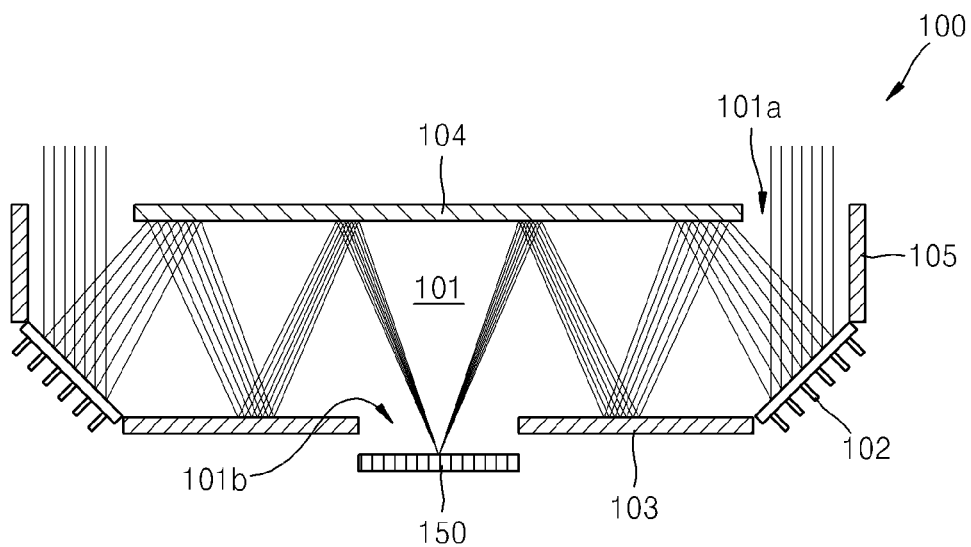
FIG. 1 is a schematic sectional view of a zoom lens and an image pickup apparatus including the zoom lens according to an exemplary embodiment.

Reference will now be made in detail to exemplary embodiments which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list. Like reference numerals in the drawings denote like elements. In the drawings, the thicknesses of layers and regions are exaggerated for clarity. It will also be understood that when a layer is referred to as being "on" another layer or substrate, it can be directly on the other layer or substrate, or intervening layers may also be present.

Figure 2:
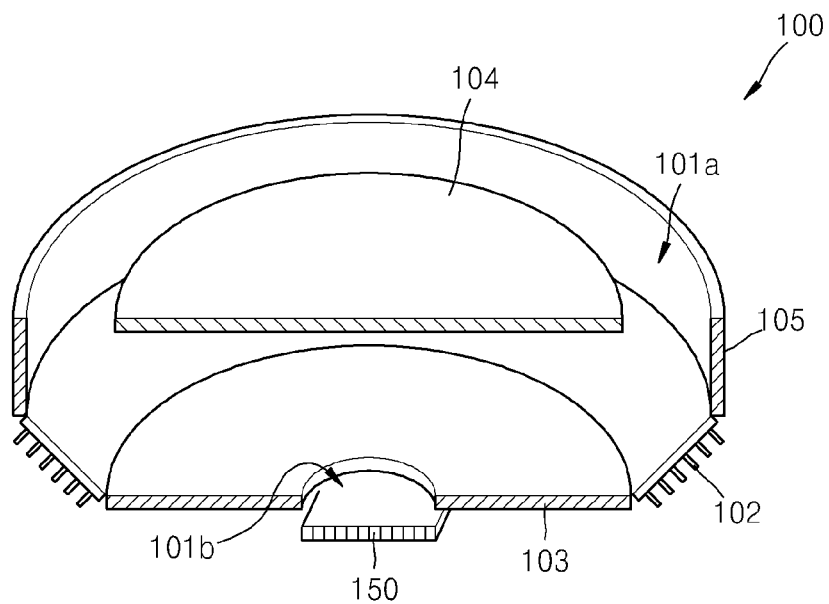
FIG. 2 is a schematic exploded perspective view of the zoom lens and the image pickup apparatus including the zoom lens of FIG. 1.

FIG. 1 is a schematic sectional view of a zoom lens 100 and an image pickup apparatus including the zoom lens 100 according to an exemplary embodiment, and FIG. 2 is a schematic exploded perspective view of the zoom lens 100 and the image pickup apparatus including the zoom lens 100. Referring to FIGS. 1 and 2, the zoom lens 100 according to the present embodiment may include a first reflection plate 103 and a second reflection plate 104 having reflection surfaces facing each other, a light incidence region 101a formed around the second reflection plate 104, a light exit region 101b formed through a center portion of the first reflection plate 103, and a deformable mirror 102 arranged around the first reflection plate 103. As shown in FIG. 2, the first reflection plate 103 may have a ring-like shape having an opening at a center portion thereof, and the second reflection plate 104 may have a circular shape. Furthermore, the light incidence region 101a may be formed in a ring-like shape around the second reflection plate 104, and the deformable mirror 102 may also be formed in a ring-like shape around the first reflection plate 103. The deformable mirror 102 and the light incidence region 101a may be arranged to face each other.

Furthermore, the image pickup apparatus according to the present embodiment may include the zoom lens 100 and an image sensor 150, which is arranged to receive light transmitted through the light exit region 101b of the zoom lens 100, and includes a plurality of 2-dimensionally arranged pixels. The image sensor 150 may be a charge-coupled device (CCD) image sensor or a complementary metal oxide semiconductor (CMOS) image sensor.

The zoom lens 100 may further include a sidewall 105, which is arranged around the zoom lens 100 and defines an outer edge of the light incidence region 101a. The first reflection plate 103, the second reflection plate 104, and the sidewall 105 may define outer boundaries of an empty space 101 in the zoom lens 100, in which light may travel. The empty space 101 may be filled with air or may be filled with transparent glass or transparent plastic.

The deformable mirror 102 may be inclined between the first reflection plate 103 and the sidewall 105 to reflect light incident via the light incidence region 101a of the zoom lens 100 toward the second reflection plate 104. The deformable mirror 102 may be a driven mirror configured to change a length of a light traveling path (an optical path) between the first reflection plate 103 and the second reflection plate 104 until the light incident via the light incidence region 101a reaches the light exit region 101b. For example, the driven mirror 102 may have a deformable reflection surface that may be deformed into different shapes via mechanical or electrical manipulation. To this end, the reflection surface of the driven mirror 102 may be formed of a flexible member, where fine electrical or mechanical devices for deforming the reflection surface by locally pulling or pushing the reflection surface may be arranged in the form of a 2D array on a rear surface of the flexible member. For example, a plurality of piezoelectric actuators may be 2-dimensionally arranged on the flexible reflection surface of the deformable mirror 102 or on a rear surface opposite the flexible reflection surface of the deformable mirror 102.

In the zoom lens 100 according to the present embodiment having the structure described above, light incident via the light incidence region 101a is first reflected by the deformable mirror 102 arranged to face the light incidence region 101a. Then, the light is incident on the reflection surface of the second reflection plate 104. Then, the light is repeatedly reflected between the second reflection plate 104 and first reflection plate 103 and gradually travels toward the center of the zoom lens 100. Since a light traveling path is bent a plurality of times by the first reflection plate 103 and the second reflection plate 104, the zoom lens 100 may be considered as a folded optics zoom lens.

According to the present embodiment, the reflection surface of the deformable mirror 102 may be mechanically or electrically deformed, such that light, which passes through the light exit region 101b and reaches the image sensor 150, forms an image on a photosensitive surface of the image sensor 150. Furthermore, a focal length of the zoom lens 100 may be freely adjusted by controlling an angle at which a light reflected by the deformable mirror 102 travels by deforming the reflection surface of the deformable mirror 102. For example, if light reflected by the deformable mirror 102 travels at an angle close to a normal line perpendicular to reflection surfaces of the first reflection plate 103 and the second reflection plate 104, the light travels a relatively long distance from the deformable mirror 102 to the image sensor 150, and thus a focal length increases. On the contrary, if light reflected by the deformable mirror 102 travels at an angle far from a normal line perpendicular to the reflection surfaces of the first reflection plate 103 and the second reflection plate 104, the light travels a relatively short distance from the deformable mirror 102 to the image sensor 150, and thus a focal length decreases. Furthermore, to precisely form an image on the photosensitive surface of the image sensor 150, even if a focal length changes, and to remove aberration, the deformable mirror 102 may be additionally deformed to a designated shape calculated in advance.

In the zoom lens 100 according to the present embodiment, a thickness of the zoom lens 100 may be significantly reduced by extending the light traveling path by using the two reflection plates, namely, first and second reflection plates 103 and 104, facing each other. In other words, the thickness of the zoom lens 100 may be reduced to the distance between the two reflection plates, namely, the first and second reflection plates 103 and 104, regardless the focal length. Furthermore, the deformable mirror 102 may adjust the focal length of the zoom lens 100 by controlling a length of a path in which light travels to form an image on the image sensor 150, and thus the zoom lens 100 may have a relatively small thickness while still enabling a zooming function. Furthermore, since the focal length of the zoom lens 100 is determined based on the length of the light traveling path between the first reflection plate 103 and the second reflection plate 104, a thickness of the zoom lens 100 is not changed even while a focal length is being changed. Therefore, an image pickup apparatus including the zoom lens 100 according to the present embodiment may be used in a thin mobile device.

Figure 3:
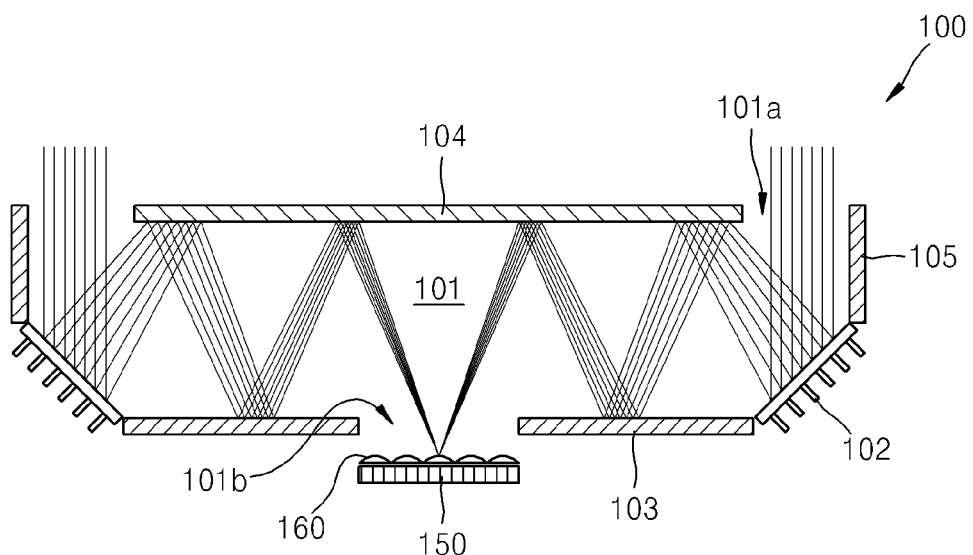
FIG. 3 is a schematic sectional view of an image pickup apparatus according to another exemplary embodiment.

FIG. 3 is a schematic sectional view of an image pickup apparatus according to another exemplary embodiment. The image pickup apparatus of FIG. 3 includes the zoom lens 100 and the image sensor 150 that are identical to those shown in FIG. 1 and a micro-lens array 160 arranged between the zoom lens 100 and the image sensor 150.

Figure 4:
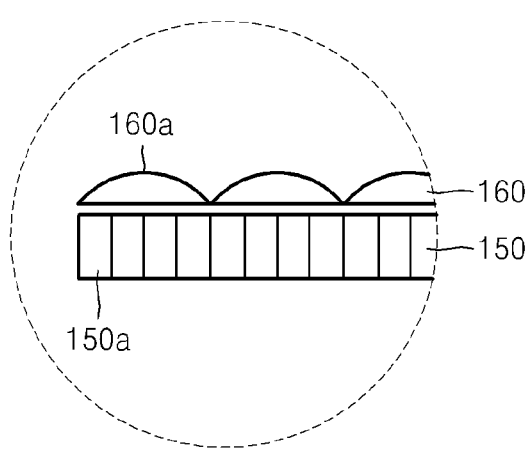
FIG. 4 is a magnified sectional view showing configurations of an image sensor and a micro-lens array shown in FIG. 3 in closer detail.

FIG. 4 is a magnified sectional view showing configurations of the image sensor 150 and the micro-lens array 160, shown in FIG. 3, in closer detail. As shown in FIG. 4, the micro-lens array 160 may include a plurality of micro-lenses 160*a*. Each of the micro-lenses 160*a* of the micro-lens array 160 may correspond to a plurality of pixels 150*a* of the image sensor 150. In this case, the reflection surface of the deformable mirror 102 may be controlled such that an image is formed at a position corresponding to the micro-lens array 160. In other words, the micro-lens array 160 may be positioned on the focal plane of the zoom lens 100. Alternatively, the micro-lens array 160 may be a designated distance apart from the focal plane of the zoom lens 100.

Based on known light-field techniques, the image pickup apparatus shown in FIG. 3 may provide a plurality of images with different viewpoints or different focuses to the plurality of pixels 150*a* corresponding to the micro-lenses 160*a*. Depth information regarding an object may be extracted by using a plurality of images with different viewpoints that are respectively obtained by the pixels 150*a*, and thus the image pickup apparatus may be utilized as a 3D camera. Furthermore, by using a plurality of images with different focuses that are obtained by different ones of the pixels 150*a*, an image may be post-processed to focus on an arbitrary object which is selected by a user.

Figure 5:
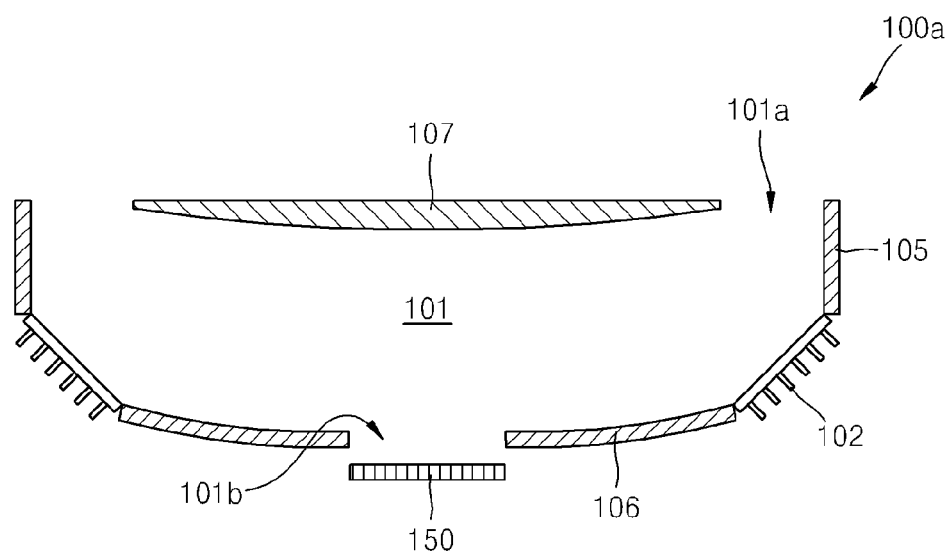
FIG. 5 is a schematic sectional view showing configurations of a zoom lens according to a modified exemplary embodiment and an image pickup apparatus including the zoom lens.

FIG. 5 is a schematic sectional view showing configurations of a zoom lens 100*a* according to a modified exemplary embodiment and an image pickup apparatus including the zoom lens 100*a*. In the zoom lens 100 according to the embodiment shown in FIG. 1, the reflection surfaces of both the first reflection plate 103 and the second reflection plate 104 re flat. However, the zoom lens 100*a* shown in FIG. 5 may include a first reflection plate 106 having a concave reflection surface and a second reflection plate 107 having a convex reflection surface. A curvature of the concave surface of the first reflection plate 106 and a curvature of the convex surface of the second reflection plate 107 may be suitably determined to form a focus on the image sensor 150 in consideration of a size of the zoom lens 100*a*. Furthermore, the reflection surfaces of the first reflection plate 106 and the second reflection plate 107 may be formed as aspheric surfaces in consideration of aberration. The image pickup apparatus shown in FIG. 5 may also employ the micro-lens array 160 shown in FIG. 3.

Although not shown, the structure shown in FIG. 1 and the structure shown in FIG. 5 may be combined with each other. For example, a first reflection plate 103 having a flat reflection surface and a second reflection plate 107 having a convex reflection surface may be combined with each other, or a first reflection plate 106 having a concave reflection surface and a second reflection plate 104 having a flat reflection surface may be combined with each other. Furthermore, the reflection surface of the first reflection plate 106 may be a convex reflection surface, and a reflection surface of the second reflection plate 107 may be a concave reflection surface.

Figure 6:
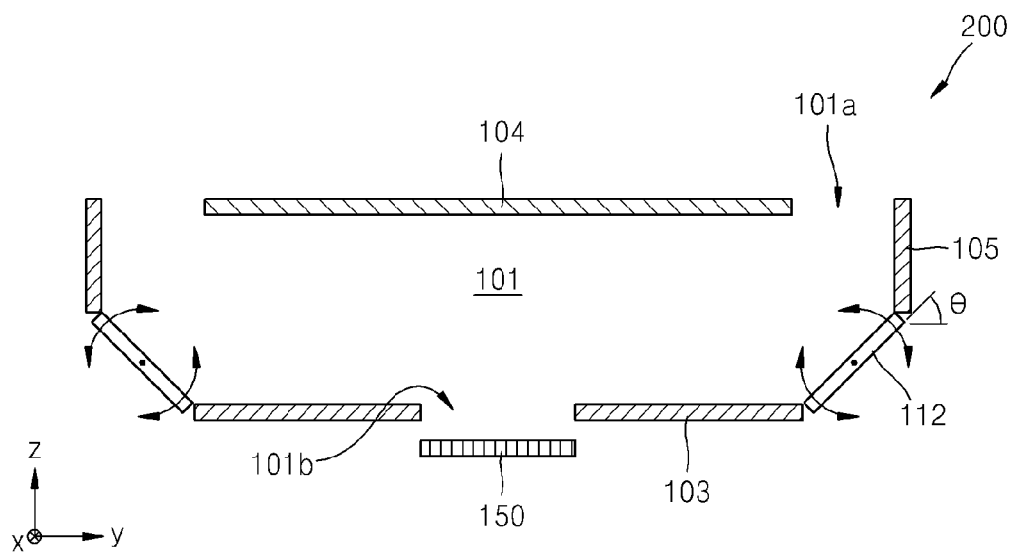
FIG. 6 is a schematic sectional view showing configurations of a zoom lens according to another exemplary embodiment and an image pickup apparatus including the zoom lens.

FIG. 6 is a schematic sectional view showing configurations of a zoom lens 200 according to another exemplary embodiment and an image pickup apparatus including the zoom lens 200. Compared to the embodiment shown in FIG. 1, the zoom lens 200 shown in FIG. 6 includes a rotatable mirror 112 as a driven mirror, instead of the deformable mirror 102. The rotatable mirror 112 may control an angle of reflection of light incident via the light incidence region 101*a* by rotating around a rotation axis. For example, a direction parallel to the rotation axis (the x-axis direction) of the rotatable mirror 112 may be perpendicular to a direction of the optical axis of the zoom lens 200 (the z-axis direction) and a radial direction of the zoom lens 200 (the y-axis direction).

According to the present embodiment, a focal length of the zoom lens 200 may be adjusted based on an angle θ of the rotatable mirror 112 with respect to a horizontal plane. For example, if the angle θ decreases, a distance that light travels from the rotatable mirror 112 to the image sensor 150 increases, and thus focal length increases. On the contrary, if the angle θ increases, a distance that light travels from the rotatable mirror 112 to the image sensor 150 decreases, and thus focal length decreases.

Although not shown in FIG. 6, the direction of the rotation axis of the rotatable mirror 112 is continuously changed along the circumferential direction of the zoom lens 200. Therefore, the rotatable mirror 112 may be divided into a plurality of parts around the first reflection plate 103. In other words, a plurality of rotatable mirrors 112 may be arranged around the first reflection plate 103.

Figure 7:
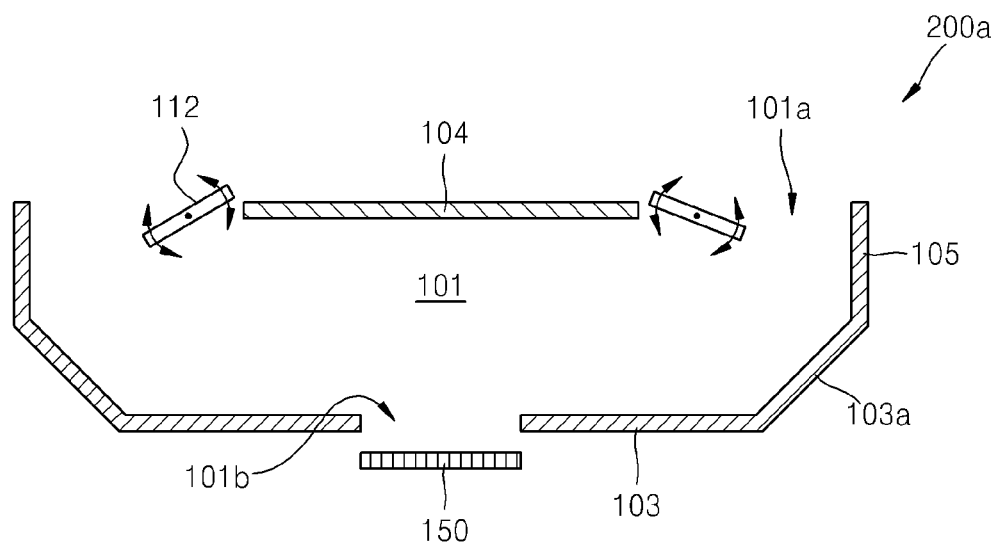
FIG. 7 is a schematic sectional view showing configurations of a zoom lens 200a according to another exemplary embodiment and an image pickup apparatus including the zoom lens.

FIG. 7 is a schematic sectional view showing configurations of a zoom lens 200*a* according to another exemplary embodiment and an image pickup apparatus including the zoom lens 200*a*. Though the rotatable mirrors 112 are arranged around the first reflection plate 103 in the embodiment shown in FIG. 6, the rotatable mirror 112 may be arranged around the second reflection plate 104 in the zoom lens 200*a* shown in FIG. 7. Furthermore, to reflect light toward the rotatable mirror 112, an tilted mirror 103*a* may be further arranged around the first reflection plate 103.

In other words, the zoom lens 200*a* shown in FIG. 7 may include the rotatable mirror 112 arranged around the second reflection plate 104 and the tilted mirror 103*a* arranged around the first reflection plate 103. Position of the tilted mirror 103*a* is identical to that of the rotatable mirror 112 shown in FIG. 6. For example, the tilted mirror 103*a* may be arranged to be inclined between the first reflection plate 103 and the sidewall 105. The tilted mirror 103*a* may reflect light incident via the light incidence region 101*a* toward the rotatable mirror 112. The rotatable mirror 112 may reflect light reflected by the tilted mirror 103*a* toward the first reflection plate 103. The remaining configuration of the zoom lens 200a shown in FIG. 7 is identical to that of the zoom lens 200 shown in FIG. 6.

The configuration shown in FIG. 7 may also be applied to the zoom lens 100 of FIG. 1. For example, in the configuration shown in FIG. 1, the deformable mirror 102 may be arranged around the second reflection plate 104, and the tilted mirror 103a may be arranged around the first reflection plate 103.

Figure 8:
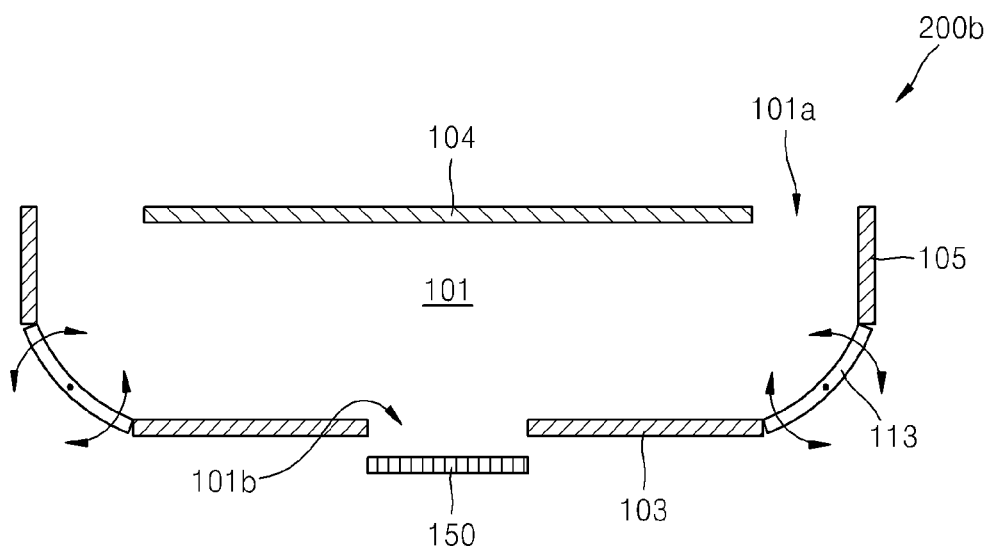
FIG. 8 is a schematic sectional view showing configurations of a zoom lens 200b according to another exemplary embodiment and an image pickup apparatus including the zoom lens.

FIG. 8 is a schematic sectional view showing configurations of a zoom lens 200b according to another embodiment and an image pickup apparatus including the zoom lens 200b. Though the rotatable mirror 112 has a flat reflection surface in the embodiment shown in FIG. 6, the rotatable mirror 112 shown in FIG. 8 may have a concave reflection surface. Otherwise, the configuration and the operation of the zoom lens 200b are identical to those of the zoom lens 200 shown in FIG. 6. Furthermore, the concave rotatable mirror 112 shown in FIG. 8 may also be arranged around the second reflection plate 104, instead of around the first reflection plate 103.

Figure 9:
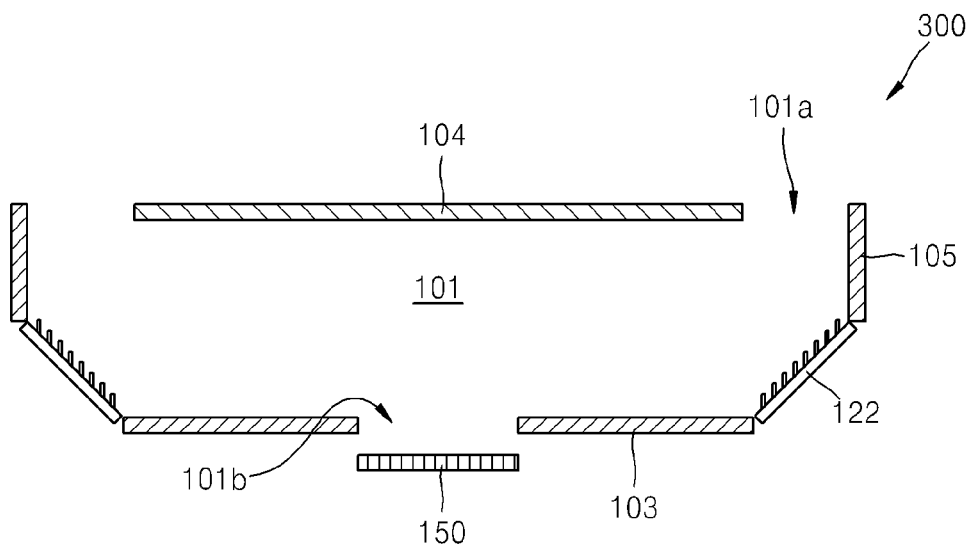
FIG. 9 is a schematic sectional view showing configurations of a zoom lens according to another exemplary embodiment and an image pickup apparatus including the zoom lens.

FIG. 9 is a schematic sectional view showing configurations of a zoom lens 300 according to another exemplary embodiment and an image pickup apparatus including the zoom lens 300. Compared to the embodiment shown in FIG. 1, the zoom lens 300 shown in FIG. 9 may include a micro-mirror array 122 as a driven mirror, instead of the deformable mirror 102. The micro-mirror array 122 may be fabricated on a semiconductor substrate by using a micro electro-mechanical system (MEMS) technique. The micro-mirror array 122 may include a plurality of micro-mirrors that may be electrostatically driven. The plurality of micro-mirrors having very small sizes may be 2-dimensionally arranged on a semiconductor substrate and each of the plurality of micro-mirrors may be independently and electrostatically driven. Although FIG. 9 shows that the micro-mirror array 122 is arranged around the first reflection plate 103, the micro-mirror array 122 may be arranged around the second reflection plate 104 as shown in FIG. 7.

In the zoom lens 300 shown in FIG. 9, light incident via the light incidence region 101a is first reflected by the micro-mirror array 122. Then, the light is incident on a reflection surface of the second reflection plate 104. Then, the light is repeatedly reflected between the second reflection plate 104 and first reflection plate 103 and gradually travels toward the center of the zoom lens 300. Finally, the light is incident on the image sensor 150 via the light exit region 101b. According to the present embodiment, respective angles of the plurality of micro-mirrors may be controlled such that light reaching the image sensor 150 forms an image on the photosensitive surface of the image sensor 150. Particularly, to form an image precisely on the photosensitive surface of the image sensor 150 and to remove aberration, the plurality of micro-mirrors of the micro-mirror array 122 may be driven at different angles based on respective locations of the micro-mirrors.

Figure 10:
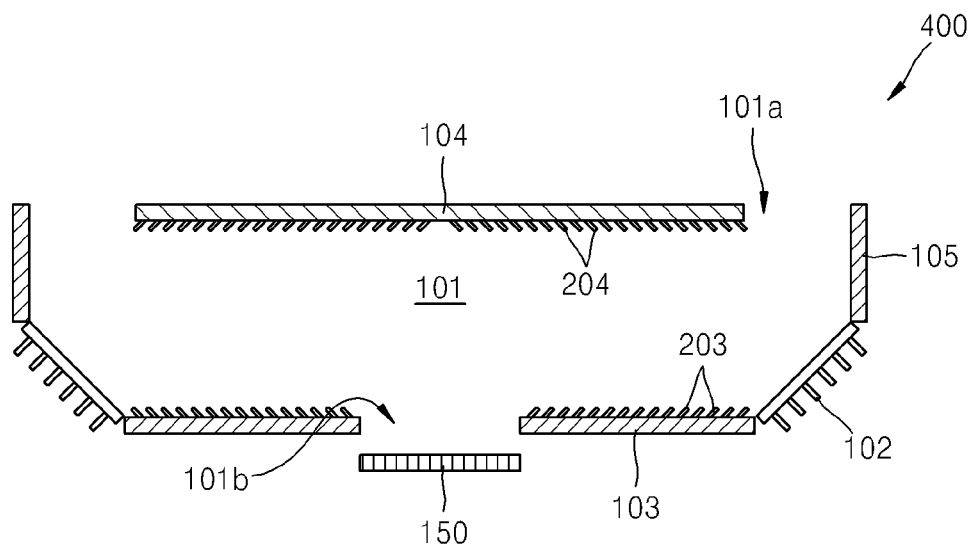
FIG. 10 is a schematic sectional view showing configurations of a zoom lens according to another exemplary embodiment and an image pickup apparatus including the zoom lens.

FIG. 10 is a schematic sectional view showing configurations of a zoom lens 400 according to another exemplary embodiment and an image pickup apparatus including the zoom lens 400. Compared to the embodiment shown in FIG. 1, reflection surfaces of the first reflection plate 103 and the second reflection plate 104 may respectively include micro-mirror arrays 203 and 204 consisting of a plurality of micro-mirrors that may be electrostatically driven. The micro-mirror arrays 203 and 204 may be formed on the reflection surfaces of the first reflection plate 103 and the second reflection plate 104 by using an MEMS technique, respectively. The plurality of small micro-mirrors of the micro-mirror arrays 203 and 204 may be 2-dimensionally arranged on the reflection surfaces of the first reflection plate 103 and the second reflection plate 104 and each of the plurality of micro-mirrors may be independently and electrostatically driven. Although FIG. 10 shows that the micro-mirror arrays 203 and 204 are arranged on the reflection surfaces of both the first reflection plate 103 and the second reflection plate 104, the zoom lens 400 may include only one of the micro-mirror arrays 203 and 204.

In the zoom lens 400 shown in FIG. 10, when a reflection surface of the deformable mirror 102 is deformed, inclination angles of the plurality of micro-mirrors of the micro-mirror arrays 203 and 204 may be independently changed in correspondence to the deformation of the deformable mirror 102. Therefore, even if a light traveling path between the first reflection plate 103 and the second reflection plate 104 is changed by deformation of the deformable mirror 102, an image may be precisely focused on the image sensor 150 by fine-controlling inclination angles of the plurality of micro-mirrors of the micro-mirror arrays 203 and 204.

Although FIGS. 6 through 10 show that the zoom lens 200, 200a, 200b, 300, or 400 includes the first reflection plate 103 and the second reflection plate 104 having flat reflection surfaces, the zoom lens 200, 200a, 200b, 300, or 400 may also include the first reflection plate 106 and the second reflection plate 107 having concave or convex reflection surfaces.

It should be understood that the exemplary embodiments described herein should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the present disclosure as defined by the following claims.

What is claimed is:

1. A zoom lens comprising:
   a first reflection surface;
   a second reflection surface facing the first reflection surface;
   a light incident region around an outer circumference of the second reflection surface;
   a light exit region in a hole formed in a center of the first reflection surface; and
   a deformable mirror disposed around an outer circumference of the first reflection surface and configuration to reflect light incident from the light incidence region toward the second reflection surface, the deformable mirror comprising a reflection surface that is mechanically or electrically deformable;
   wherein the first reflection surface and the second reflection surface form an optical path, wherein light incident via the light incidence region is reflected between the first reflection surface and the second reflection surface until the light exits the zoom lens via the light exit region; and
   wherein the deformable mirror is configured to change a length of the optical path between the light incidence region and the light exit region.

2. The zoom lens of claim 1, wherein the first reflection surface has a ring-like shape and the second reflection surface has a circular shape.

3. The zoom lens of claim 1, wherein the first reflection surface and the second reflection surface are planar.

4. The zoom lens of claim 1, wherein the first reflection surface is concave, and the second reflection surface is convex.

5. An image pickup apparatus comprising:
a zoom lens comprising:
   a first reflection plate;
   a second reflection plate comprising a reflection surface facing a reflection surface of the first reflection plate;
   a light incidence region disposed around a circumferences of the second reflection plate;
   a light exit region disposed in a hole in a center portion of the first reflection plate; and
   a driven mirror, which is disposed around an outer circumferences of the first reflection plate, wherein the driven mirror reflects light incident from the light incidence region toward the second reflection plate, the driven mirror comprising a reflection surface that is mechanically or electrically deformable; and
an image sensor, which is disposed at the light exit region of the zoom lens and comprises a plurality of 2-dimensionally arranged pixels,
wherein the first reflection plate, the second reflection plate, and the driven mirror form an optical path wherein light incident via the light incidence region is reflected by the driven mirror, and is reflected between the second reflection plate and the first reflection plate until the light exits the zoom lens via the light exit region and is incident on the image sensor, and wherein the driven mirror is configured to change a length of the optical path.

6. The image pickup apparatus of claim 5, wherein the image sensor comprises one of a charge-coupled device image sensor and a complementary metal oxide semiconductor image sensor.

7. The image pickup apparatus of claim 5, further comprising a micro-lens array, which is disposed between the zoom lens and the image sensor and comprises a plurality of 2-dimensionally arranged micro-lenses.

8. The image pickup apparatus of claim 7, wherein each of the micro-lenses of the micro-lens array correspond to a plurality of pixels of the image sensor, and
   the micro-lenses of the micro-lens array provide a plurality of images with different viewpoints or different focuses to the plurality of pixels.

9. The image pickup apparatus of claim 7, wherein the micro-lens array is disposed on a focal plane of the zoom lens.

* * * * *